(12) United States Patent
Ramanath et al.

(10) Patent No.: US 8,994,825 B2
(45) Date of Patent: Mar. 31, 2015

(54) VEHICLE REAR VIEW CAMERA SYSTEM AND METHOD

(75) Inventors: Ravikiran Ramanath, Tumkur (IN); Jeffrey Bochenek, Milford, MI (US); Gunter Rottner, Wixom, MI (US)

(73) Assignee: Robert Bosch GmbH, Stuttgart (DE)

( * ) Notice: Subject to any disclaimer, the term of this patent is extended or adjusted under 35 U.S.C. 154(b) by 425 days.

(21) Appl. No.: 13/558,748

(22) Filed: Jul. 26, 2012

(65) Prior Publication Data

US 2013/0027558 A1 Jan. 31, 2013

Related U.S. Application Data

(60) Provisional application No. 61/512,798, filed on Jul. 28, 2011.

(51) Int. Cl.
*H04N 7/18* (2006.01)
*G06T 3/00* (2006.01)

(52) U.S. Cl.
CPC .................................. *G06T 3/0018* (2013.01)
USPC ......................................................... 348/148

(58) Field of Classification Search
USPC .................... 348/148, 115, 46, 739, 153, 159
See application file for complete search history.

(56) References Cited

U.S. PATENT DOCUMENTS

| 8,749,632 | B2* | 6/2014 | Yamada et al. ................ 348/148 |
| 8,780,202 | B2* | 7/2014 | Yamada et al. ................ 348/148 |
| 2002/0130953 | A1* | 9/2002 | Riconda et al. ............... 348/115 |
| 2009/0096937 | A1* | 4/2009 | Bauer et al. ................... 348/739 |
| 2010/0103264 | A1 | 4/2010 | Nagao |
| 2011/0285848 | A1* | 11/2011 | Han et al. ...................... 348/148 |
| 2013/0314503 | A1* | 11/2013 | Nix et al. ........................ 348/46 |

FOREIGN PATENT DOCUMENTS

| JP | 2003212041 | 7/2003 |
| JP | 2007028443 | 2/2007 |
| JP | 2008102620 | 8/2008 |
| WO | 2011030698 | 3/2011 |

OTHER PUBLICATIONS

European Patent Office Examination Report for Application No. 12178170.2 dated Aug. 22, 2014 (4 pages).
European Search Report for Application No. 12178170.2 dated Nov. 18, 2013 (7 pages).

* cited by examiner

*Primary Examiner* — Paulos M Natnael
(74) *Attorney, Agent, or Firm* — Michael Best & Friedrich LLP

(57) ABSTRACT

A computer-implemented method for reconstructing and displaying an image of an area behind a vehicle. The method includes capturing, by an image capturing device, an image of the area behind the vehicle; receiving, at a controller, the captured image; separating, by the controller, the image into three image pieces; correcting, at the controller, the middle image piece by using a distortion correction algorithm; cropping, at the controller, the first and second side image pieces into a rectangular format; converting, at the controller, the first and second image pieces into a trapezoidal format; aligning, at the controller, the two side image pieces with the corrected middle image piece; and creating, at the controller, a continuous image of the area behind the vehicle.

19 Claims, 4 Drawing Sheets

VEHICLE REAR VIEW CAMERA SYSTEM AND METHOD

CROSS-REFERENCE TO RELATED APPLICATIONS

This application claims priority to U.S. Provisional Application No. 61/512,798, filed on Jul. 28, 2011, which is incorporated herein by reference in its entirety.

BACKGROUND

The present invention relates to rear view cameras for vehicles.

SUMMARY

Generally, rear view or "back up" cameras in vehicles are used to assist drivers when parking the vehicle or exiting from a parking space. Rear view cameras display an image of a blind spot behind the vehicle. These cameras typically have a field of view ("FOV") in the horizontal axis that shows almost the entire rear bumper of the vehicle and the area from the ground to part of the horizon in the vertical FOV. The lenses used for these rear view cameras are considered to be "wide angle" lenses since the horizontal FOV ("HFOV") is greater than 90 degrees. Typically, the HFOV is 130 degrees and the vertical FOV is 95 degrees.

Although conventional rear view cameras can accurately display the scene in the vehicle's rear blind spot, there are still scenarios where the FOV of the camera is not wide enough. One of these cases is when the vehicle is parked in a parking lot with vehicles parked on either side. In that case, when the driver attempts to back out from the parking spot, he or she must move until the 'B' pillar of the vehicle reaches the bumper of the cars parked on either side of the vehicle. This allows a clear view of traffic, but requires moving a large portion of the vehicle into an area where a collision with traffic, objects, or people could occur.

Additionally, even when a vehicle includes a rear view camera that has a 180 degree HFOV, the image from the camera must be electronically corrected to remove the large amount of distortion that occurs as a result of using such a large HFOV lens. This distortion correction, if not done effectively, can cause moving objects to look like they are being stretched as they pass through different parts of the scene.

One solution that has been implemented to help provide the driver a better view of the oncoming traffic while in a parking lot is to use a 180 degree lens in the rear view camera and split the image in to three pieces. Then, these pieces are arranged on the vehicle display screen to represent an image of the area behind the vehicle. This allows the driver to view any oncoming traffic without having to move the vehicle at all since the 180 degree camera will show the scene behind the entire bumper of the vehicle. However, the distortion correction algorithm employed by these cameras provides a poor final image. Therefore, there is a need for an enhanced rear view camera system and a method of dewarping (or distortion-correcting) a 180 degree field of view image and reconstructing it to improve the viewing of moving objects behind the vehicle.

In one embodiment, the invention provides a computer-implemented method for reconstructing and displaying an image of an area behind a vehicle. The method includes capturing, by an image capturing device, an image of the area behind the vehicle; receiving, at a controller, the captured image; separating, by the controller, the image into three image pieces—a middle piece and two side pieces. The method also includes correcting, at the controller, the middle image piece by using a distortion correction algorithm; cropping, at the controller, the first and second side image pieces into a rectangular format; converting, at the controller, the first and second image pieces into a trapezoidal format; aligning, at the controller, the two, cropped side image pieces with the corrected middle image piece; and creating, at the controller, a continuous or combined image of the area behind the vehicle.

In another embodiment, the invention provides a system for reconstructing and displaying an image of an area behind a vehicle. The system includes at least one image capturing device configured to capture an image of the area behind the vehicle, a controller configured to receive the captured image, and a computer readable medium storing instructions. When executed by the controller, the instructions cause the controller to: separate the image into three image pieces—a first side piece, a middle piece, and a second side piece, correct the middle image piece by using a distortion correction algorithm, crop the first and second side image pieces into a trapezoidal format, crop the first and second side image pieces into a rectangular format, convert he first and second image pieces into a trapezoidal format, align the first and second side image pieces with the corrected middle image piece, and create a combined image of the area behind the vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
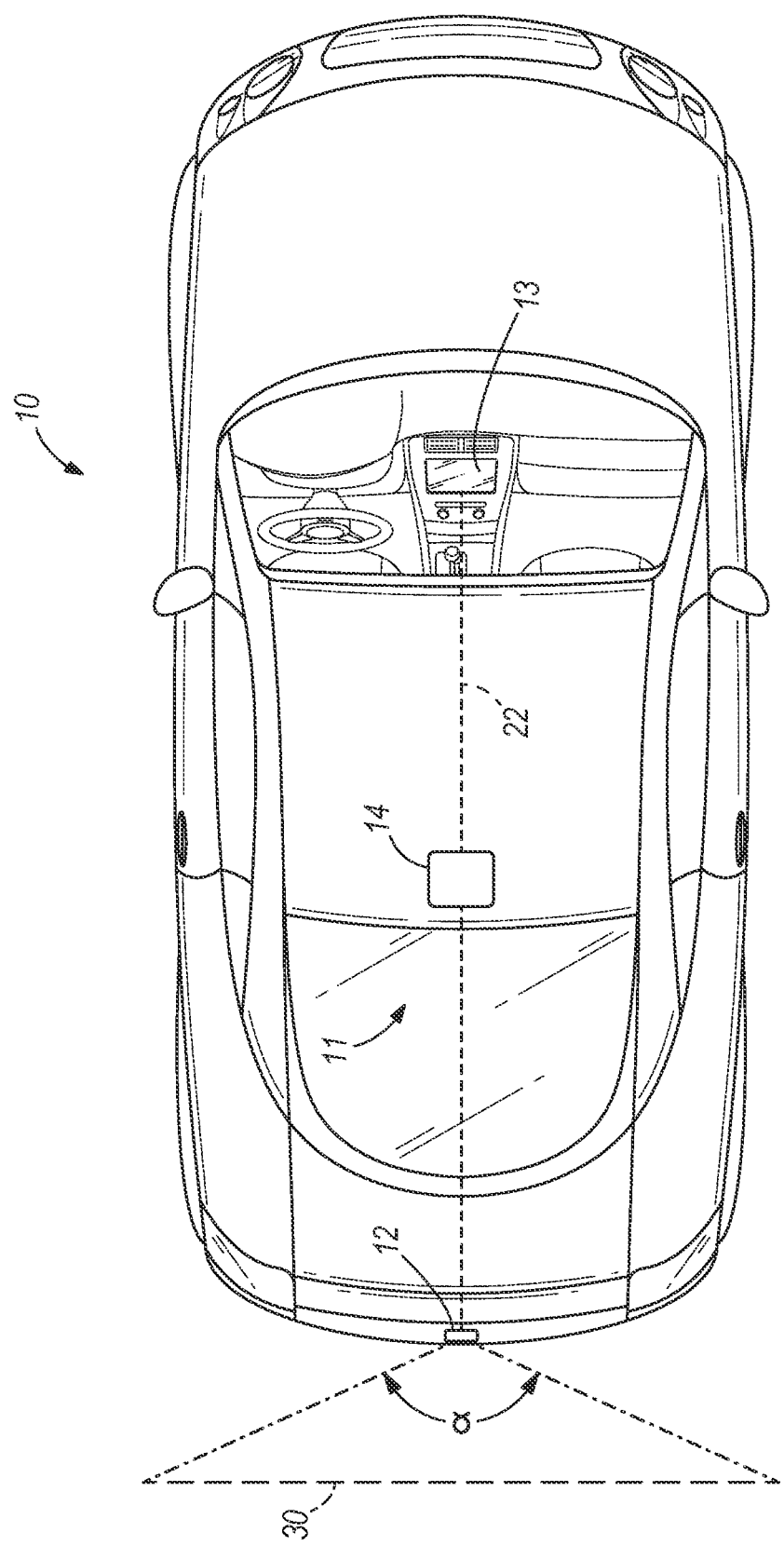
FIG. 1 illustrates a vehicle including a rear view camera system.

FIG. 1 illustrates a vehicle 10. The vehicle 10 includes a rear view camera system 11 used for capturing and displaying images. The system 11 includes a camera 12, a display device 13, and a controller 14. In one embodiment, the camera 12 is mounted on the rear portion of the vehicle 10 and the display device 13 (e.g., an LCD monitor) is located on the dashboard of the vehicle. The camera 12, the display device 13, and the controller 14 are connected to a network, such as a controller area network ("CAN") bus 22. The CAN bus 22 is connected to other vehicle systems. Alternatively, other connections (such as direct wired or wireless connections) can be used to connect the camera 12 and display device 13 to the controller 14.

In one embodiment, the camera 12 includes a wide-angle lens (e.g., 180 degree lens, not shown) that is configured to captures images of the area and objects behind the vehicle. The controller 14 includes a graphic processing module 25 configured to process the images obtained from the camera 12 and to display these images on the display device 13. In alternative embodiment, the system 11 can also include one or more sensors 20 (such as radar sensors) that are used to sense and report the location of various objects around the vehicle 10. Although sensors and radar devices can be used to supplement the operation of the camera 15 and to provide more precise data, these devices are not necessary in all implementations of the system 12.

The camera 12 is mounted in the rear portion of the vehicle 10. For example, the camera 12 can be positioned in the center of the rear bumper of the vehicle 10 and is pointed backward. Due to the wide-angle lens, the field of view 30 of the camera 12 covers a space in the back of the vehicle 10 that extends beyond the width of the vehicle 10. The camera 12 monitors the driving path of the vehicle, various objects in the surrounding environment, and continuously captures images in the visible and/or near infrared spectrum. The camera provides images (or image data) to the controller 14. The controller 14 processes the images to detect stationary objects, such as pavement, a wall, a parked vehicle, or a utility pole, and moving objects, such as a pedestrian or a moving vehicle.

The position of the camera 12 of the system 11 can vary depending on the particular vehicle in which it is installed and the type of camera used. The system 11 can also include more than one camera 12. The camera 12 can be configured in a number of ways. For example, in one configuration the camera 12 includes a monocular camera module. In another configuration, the camera includes a binocular camera module. In addition, the camera can be designed or built based on one or more detection technologies such as a complimentary metal-oxide semiconductor ("CMOS") or charge-coupled device ("CCD") technologies. The camera can capture monochrome (black and white) or color images.

When a wide-angle lens is used, the horizontal field of view of is enlarged (e.g., to angle of approximately a=180° as shown in FIG. 1). In that embodiment, the field of view in the vertical direction is also enlarged. Different types of lens may be used to provide desired horizontal and vertical fields of view so that the camera 12 captures objects that are located within a predetermined distance from the vehicle 10. When wide-angle and other specific lens are used, distortion caused by the lens is corrected by distortion correction algorithms executed by the controller 14.

In one embodiment, the camera 12 is a Video Graphics Array (VGA) camera. The VGA camera generally has less pixels than more expensive cameras. For example, the camera 12 outputs a 640×480 pixel image. Using a VGA camera allows a manufacturer to create an inexpensive product. Further, the VGA camera has a better low light performance than a camera with more pixels. In other embodiment, the camera 12 is a camera that has more pixels (i.e., mega) than a standard VGA camera.

Figure 2:
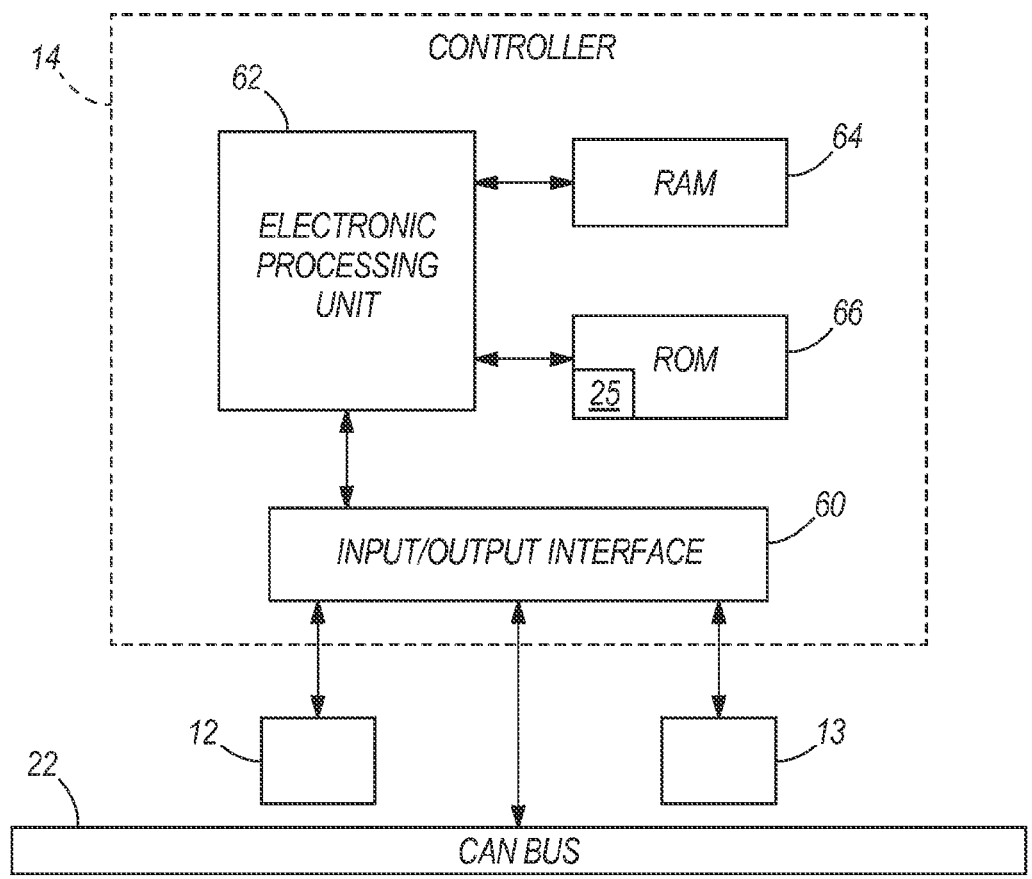
FIG. 2 schematically illustrates the rear view camera system of FIG. 1.

FIG. 2 schematically illustrates the rear view camera system 11 in more detail. As shown in FIG. 2, the system 12 includes the controller 14, the camera 12, the display device 13, and the bus 22. In some embodiments, the controller 14 obtains images directly from the camera 12 rather than over the bus 22. It is to be understood that arrangement and positions of the system components shown in FIGS. 1 and 2 is for illustrative purposes only.

As shown in FIG. 2, the controller 14 includes an input/output interface 60, an electronic processing unit ("EPU") 62, and one or more non-transitory memory modules, such as a random access memory ("RAM") 64 and read-only memory ("ROM") 66. The input/output interface 60 transmits and receives information over the bus 22. In one embodiment, images from the camera 12 are directly transmitted to the input/output interface 60. In other embodiments, images from the camera 12 are transmitted to the input/output interface 60 via the CAN 22. The input/output interface 60 can communicate with other components inside the vehicle (e.g., over the CAN 22) and outside of the vehicle. For example, the input/output interface 60 can include a network interface, such as an Ethernet or a wireless network, that allows the system 12 to send and receive information over a network, such as a local area network or the Internet.

Figure 3:
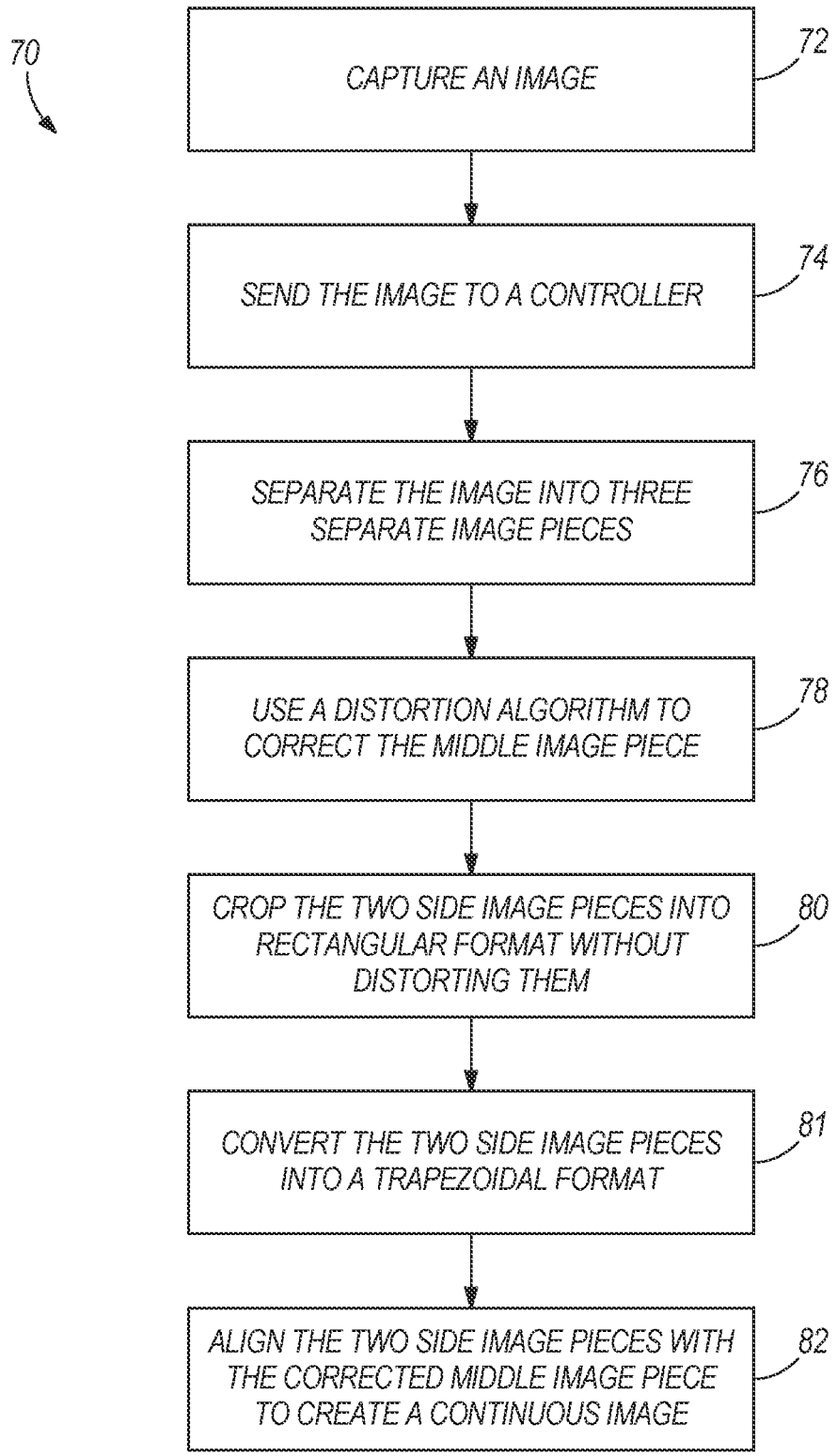
FIG. 3 is a flow chart illustrating a method for reconstructing and displaying a rear image performed by the rear view camera system of FIG. 2.

The EPU 62 receives the information from the input/output interface 60 and processes the information by executing one or more instructions or modules (e.g., the graphic processing module 25). The instructions or modules are stored in non-transitory computer-readable medium, such as ROM 66. The EPU 62 stores information (e.g., information received from the bus 22 or information generated by instructions or modules executed by the EPU 62) to the RAM 64. It should be understood that although only a single EPU, RAM, ROM, and input/output interface are illustrated in FIG. 3, the controller 14 can include multiple processing units, memory modules, and/or input/output interfaces.

Although the controller 14 is illustrated in FIGS. 1-2 as a separate component from the camera 12, in some embodiments the controller 14 is included in the camera 12. In other embodiments, the controller 14 is separate from the camera 12 to prevent faults (e.g., electrical, mechanical, or software-based) in the camera 12 from affecting the functionality provided by the controller 14. The controller 14 can also be combined with other vehicle controllers.

The instructions stored in the computer-readable media provide particular functionality when executed by the EPU 62. In general, the instructions provide one or more ways for the system 11 to capture, dewarp (or distortion-correct), and display an image of the area behind the vehicle 10. For example, FIG. 3 is a flow chart illustrating a method 70 for reconstructing and displaying a rear image performed by the controller 14. As shown in FIG. 3, the method begins with capturing an image of the area behind the vehicle by the camera 12 (at 72). Next the camera transfers the image to the controller 14 (at 74). The controller 14 separates the image into three image pieces (at 76)—a first side piece, a middle piece, and a second side piece. Then, the controller 14 uses a distortion correction algorithm to correct the middle image piece (at 78). The distortion correction may be accomplished using known techniques. Generally, the field of view of the middle image piece ranges from 100 degrees to 130 degrees. Next, the controller 14 crops the two side image pieces into a rectangular format without distortion correcting these pieces (at 80). Cropping of the side pieces may be done using known techniques. The controller then performs calibration and image stretching of the two side image pieces in order to convert the side image pieces to a trapezoidal format and to create better image representation for the driver of the vehicle (at 81). Finally, the controller 14 aligns the two side image pieces with the corrected middle image piece and creates one continuous or combined image of the area behind the vehicle (at 82). The combined image provides a more life-like and less-distorted view of the area behind the vehicle and any objects within that area.

Figure 4:
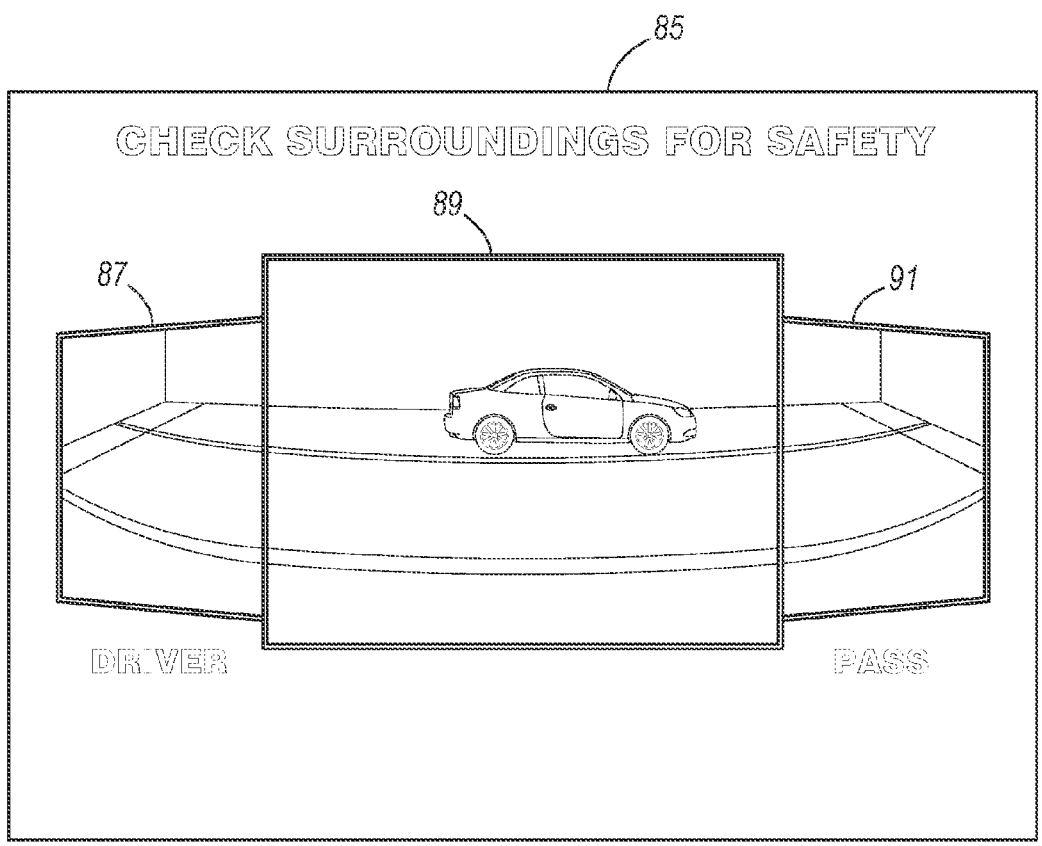
FIG. 4 illustrates a rear image captured and reconstructed by the rear view camera system of FIG. 2.

FIG. 4 illustrates an image 85 from the camera 12, after the controller 14 performs the method 70 for reconstructing and displaying an image. The image 85 is displayed on the display 13 of the vehicle 10. As shown in FIG. 4, the continuous image 85 includes a first side piece 87, a middle piece 89, and a second side piece 91 and captures the area behind the vehicle 10. The middle image piece 89 is distortion-corrected by the controller 14 and generally has a rectangular shape. In other embodiments, the middle image piece can have a different form. The first side image piece 87 and the second side image piece 91 are cropped by the controller 14 into a rectangular format without distortion correcting these pieces. Because the camera 12 that is used can be a VGA camera, the controller 14 does not need to correct the first side image piece 87 and the second side image piece 91 prior to aligning them with the middle image piece 89. Instead, the controller performs calibration and image stretching of the two side image pieces to convert them into a trapezoidal format. After the three images pieces 87, 89, and 91 are aligned into the image 85, the field of view of the middle image piece 89 ranges from about 100 degrees to about 130 degrees. The first side image piece 87 and the second side image piece 91 complete the rest of the original 180 degree image (i.e., each side piece can have field of view between 25 and 40 degrees, and the combined field of view of the first side piece 87 and the second side piece 91 in the corrected image ranges from about 50 to about 80 degrees).

Thus, the invention provides, among other things, a computer-implemented method for reconstructing and displaying an image of an area behind a vehicle. Unlike prior art techniques, the combination of a distortion corrected middle image piece with trapezoidally-cropped side image pieces creates an image of higher quality and less-visually perceptive distortion, even though the side image pieces are not actually distortion corrected. The trapezoidal cropping provides a type or kind optical illusion such that the final image (including all three pieces) appears less distorted. Various features and advantages of the invention are set forth in the following claims.

What is claimed is:

1. A computer-implemented method for reconstructing and displaying an image of an area behind a vehicle, the method comprising:
   capturing, by an image capturing device, an image of the area behind the vehicle;
   receiving, at a controller, the captured image;
   separating, by the controller, the image into three image pieces—a first side piece, a middle piece, and a second side piece;
   correcting, at the controller, the middle image piece by using a distortion correction algorithm;
   cropping, at the controller, the first and second side image pieces into a rectangular format;
   converting, at the controller, the first and second image pieces into a trapezoidal format;
   aligning, at the controller, the first and second side image pieces with the corrected middle image piece; and
   creating, at the controller, a combined image of the area behind the vehicle.

2. The method of claim 1, wherein the field of view of the middle image piece in the corrected image ranges from about 100 degrees to about 130 degrees.

3. The method of claim 1, wherein the combined field of view of the first side piece and the second side piece in the corrected image ranges from about 50 to about 80 degrees.

4. The method of claim 1, further comprising displaying the combined image on at least one display device in the vehicle.

5. The method of claim 1, wherein the image capturing device includes a wide-angle lens.

6. The method of claim 5, wherein the horizontal field of view of the image capturing device is enlarged to about 180 degrees.

7. The method of claim 5, wherein the vertical field of view of the image capturing device is enlarged.

8. The method of claim 1, wherein converting the first and second image pieces into a trapezoidal format includes performing calibration and image stretching, at the controller, of the first and the second side image pieces.

9. The method of claim 1, further comprising capturing an image of the area behind the vehicle by more than one image capturing device.

10. The method of claim 1, wherein the controller is included in the image capturing device.

11. A system for reconstructing and displaying an image of an area behind a vehicle, the system comprising:
    at least one image capturing device configured to capture an image of the area behind the vehicle;
    a controller configured to receive the captured image; and
    a computer readable medium storing instructions that, when executed by the controller, cause the controller to:
      separate the image into three image pieces—a first side piece, a middle piece, and a second side piece,
      correct the middle image piece by using a distortion correction algorithm,
      crop the first and second side image pieces into a rectangular format,
      convert he first and second image pieces into a trapezoidal format,
      align the first and second side image pieces with the corrected middle image piece, and
      create a combined image of the area behind the vehicle.

12. The system of claim 11, wherein the field of view of the middle image piece in the corrected image ranges from about 100 degrees to about 130 degrees.

13. The system of claim 11, wherein the combined field of view of the first side piece and the second side piece in the corrected image ranges from about 50 to about 80 degrees.

14. The system of claim 11, wherein the image capturing device includes a wide-angle lens.

15. The system of claim 14, wherein the horizontal field of view of the image capturing device is enlarged to about 180 degrees.

16. The system of claim 14, wherein the vertical field of view of the image capturing device is enlarged.

17. The system of claim 11, wherein the controller performing calibration and image stretching of the first and the second side image pieces.

18. The method system of claim 11, wherein the controller is included in image capturing device.

19. The method system of claim 11, wherein the image capturing device comprises a Video Graphics Array (VGA) camera.

* * * * *